United States Patent
Bruce et al.

(10) Patent No.: US 10,664,487 B2
(45) Date of Patent: *May 26, 2020

(54) MULTI-TENANCY FOR STRUCTURED QUERY LANGUAGE (SQL) AND NON STRUCTURED QUERY LANGUAGE (NOSQL) DATABASES

(71) Applicant: salesforce.com, inc., San Francisco, CA (US)

(72) Inventors: Jonathan Bruce, San Rafael, CA (US); Eli Levine, San Francisco, CA (US); Simon Toens, San Francisco, CA (US); James Taylor, San Francisco, CA (US)

(73) Assignee: salesforce.com, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,538

(22) Filed: Aug. 24, 2018

(65) Prior Publication Data

US 2018/0365299 A1 Dec. 20, 2018

Related U.S. Application Data

(63) Continuation of application No. 14/542,348, filed on Nov. 14, 2014, now Pat. No. 10,061,823.
(Continued)

(51) Int. Cl.
*G06F 16/00* (2019.01)
*G06F 16/2458* (2019.01)
(Continued)

(52) U.S. Cl.
CPC .......... *G06F 16/2471* (2019.01); *G06F 16/20* (2019.01); *G06F 16/245* (2019.01);
(Continued)

(58) Field of Classification Search
CPC .......... G06F 16/18; G06F 16/20; G06F 16/21; G06F 16/211; G06F 16/214;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Erickson, Gail, Lubor Kollar, and Jason Ward. "Improving Performance with SQL Server 2000 Indexed Views." Microsoft TechNet, Sep. (2000). (Year: 2000).*
(Continued)

*Primary Examiner* — Diedra McQuitery
(74) *Attorney, Agent, or Firm* — Jaffery, Watson, Mendonsa & Hamilton, LLP

(57) ABSTRACT

Techniques and structures for providing a multitenant environment having both a relational database and a non-relational database. A database query is received with at least one server computing device providing a multitenant environment having a relational database system and a non-relational database system, the database query in a format corresponding to the relational database system. The query is parsed with the at least one server computing device to find one or more components of the query directed to data stored in the non-relational database system. One or more components of the query directed to data stored in the non-relational database system are converted to one or more scans of the non-relational database system. Results from the query of the relational database system and results from the one or more scans of the non-relational database system are collected. The results from the query and the results of the one or more scans to a combined result are combined. The combined results are provided to a client entity.

15 Claims, 10 Drawing Sheets

Related U.S. Application Data

(60) Provisional application No. 61/904,826, filed on Nov. 15, 2013, provisional application No. 61/904,822, filed on Nov. 15, 2013, provisional application No. 61/905,439, filed on Nov. 18, 2013, provisional application No. 61/905,457, filed on Nov. 18, 2013, provisional application No. 61/905,460, filed on Nov. 18, 2013.

(51) Int. Cl.
| | |
|---|---|
| *G06F 16/25* | (2019.01) |
| *G06F 16/27* | (2019.01) |
| *G06F 16/245* | (2019.01) |
| *G06F 16/28* | (2019.01) |
| *G06F 16/20* | (2019.01) |
| G06F 16/21 | (2019.01) |
| G06F 16/18 | (2019.01) |

(52) U.S. Cl.
CPC .......... *G06F 16/25* (2019.01); *G06F 16/258* (2019.01); *G06F 16/27* (2019.01); *G06F 16/284* (2019.01); *G06F 16/18* (2019.01); *G06F 16/21* (2019.01); *G06F 16/211* (2019.01); *G06F 16/214* (2019.01); *G06F 16/217* (2019.01); *G06F 16/219* (2019.01); *G06F 16/256* (2019.01); *G06F 16/289* (2019.01)

(58) Field of Classification Search
CPC .... G06F 16/217; G06F 16/219; G06F 16/245; G06F 16/2471; G06F 16/25; G06F 16/256; G06F 16/258; G06F 16/27; G06F 16/284; G06F 16/289
See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Toneili et al. | |
| 5,831,610 A | 11/1998 | Toneili et al. | |
| 5,873,096 A | 2/1999 | Lim et al. | |
| 5,884,299 A | 3/1999 | Ramesh et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,197,520 B1 | 3/2007 | Matthews et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,958,159 B1 | 6/2011 | Tran et al. | |
| 9,104,762 B1 | 8/2015 | Ward | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0038313 A1 | 3/2002 | Klein et al. | |
| 2002/0042264 A1 | 4/2002 | Kim | |
| 2002/0042843 A1 | 4/2002 | Diec | |
| 2002/0069077 A1 | 6/2002 | Brophy et al. | |
| 2002/0072951 A1 | 6/2002 | Lee et al. | |
| 2002/0082892 A1 | 6/2002 | Raffel et al. | |
| 2002/0087552 A1 | 7/2002 | Applewhite et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120625 A1 | 6/2003 | Jackson et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0229610 A1* | 12/2003 | Van Treeck | G06F 16/25 |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |

(56) References Cited

U.S. PATENT DOCUMENTS

| | | | |
|---|---|---|---|
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0149718 | A1 | 7/2005 | Berlin |
| 2009/0177744 | A1 | 7/2009 | Marlow et al. |
| 2009/0222404 | A1 | 9/2009 | Dolin et al. |
| 2010/0121941 | A1 | 5/2010 | Harrang et al. |
| 2010/0287346 | A1 | 11/2010 | Schreter |
| 2011/0258178 | A1 | 10/2011 | Eidson et al. |
| 2011/0258179 | A1* | 10/2011 | Weissman ......... G06F 16/24544 707/714 |
| 2011/0258225 | A1* | 10/2011 | Taylor ................ G06F 16/2272 707/769 |
| 2011/0295839 | A1* | 12/2011 | Collins ............... G06F 16/2428 707/716 |
| 2012/0036146 | A1 | 2/2012 | Annapragada |
| 2012/0179762 | A1 | 7/2012 | Arora et al. |
| 2012/0310878 | A1 | 12/2012 | Vuksan et al. |
| 2014/0149400 | A1* | 5/2014 | Fu ...................... G06F 16/24564 707/723 |
| 2014/0164318 | A1* | 6/2014 | Tsai ..................... G06F 16/211 707/609 |
| 2014/0172914 | A1 | 6/2014 | Elnikety et al. |
| 2014/0337276 | A1 | 11/2014 | Iordanov |
| 2015/0134626 | A1 | 5/2015 | Theimer et al. |

OTHER PUBLICATIONS

Erickson, Gail, Lubor Kollar, and Jason Ward. "Improving Performance with SQL Server 2000 Indexed Views." Microsoft TechNet, Oct. (2008). (Year: 2008).*

Final Office Action for U.S. Appl. No. 14/542,342 dated Dec. 11, 2018, 5 pages.

Dean, Jeffrey, and Sanjay Ghemawat. "MapReduce: simplified data processing on large clusters." Communications of the ACM 51.1 (2008): 107-113. (Year: 2008).

Erickson, Gail, Lubor Kollar, and Jason Ward. "Improving Performance with SOL Server 2000 Indexed Views." Microsoft TechNet, Oct. (2008).

Final Office Action for U.S. Appl. No. 14/542,342 dated Aug. 28, 2017, 8 pages.

Final Office Action for U.S. Appl. No. 14/542,348 dated Sep. 25, 2017, 18 pages.

Final Office Action for U.S. Appl. No. 14/542,353 dated Oct. 23, 2017, 11 pages.

Final Office Action for U.S. Appl. No. 14/542,353 dated Sep. 14, 2018, 13 pages.

Final Office Action for U.S. Appl. No. 14/542,357 dated Feb. 27, 2018, 12 pages.

Final Office Action for U.S. Appl. No. 14/542,357 dated May 4, 2017, 13 pages.

Final Office Action for U.S. Appl. No. 14/542,338 dated Nov. 6, 2017, 17 pages.

Final Office Action for U.S. Appl. No. 14/542,338 dated Sep. 7, 2018, 18 pages.

Non-Final Office Action for U.S. Appl. No. 14/542,342 dated Jan. 9, 2017, 6 pages.

Non-Final Office Action for U.S. Appl. No. 14/542,342 dated May 14, 2018, 5 pages.

Non-Final Office Action for U.S. Appl. No. 14/542,348 dated Feb. 15, 2017, 13 pages.

Non-Final Office Action for U.S. Appl. No. 14/542,353 dated Apr. 4, 2017, 12 pages.

Non-Final Office Action for U.S. Appl. No. 14/542,353 dated Mar. 9, 2018, 11 pages.

Non-Final Office Action for U.S. Appl. No. 14/542,357 dated Aug. 28, 2017, 12 pages.

Non-Final Office Action for U.S. Appl. No. 14/542,357 dated Jan. 9, 2017, 10 pages.

Non-Final Office Action for U.S. Appl. No. 14/542,338 dated Feb. 1, 2017, 14 pages.

Non-Final Office Action for U.S. Appl. No. 14/542,338 dated Mar. 13, 2018, 24 pages.

Notice of Allowance for U.S. Appl. No. 14/542,348 dated May 9, 2018, 9 pages.

Notice of Allowance for U.S. Appl. No. 14/542,357 dated Aug. 27, 2018, 9 pages.

Shook, Adam, and Donald Miner. MapReduce Design Patterns. "O'Reilly Media, Inc.", (2012): Chapter 4.

Non-Final Office Action for U.S. Appl. No. 14/542,353 dated Mar. 22, 2019, 15 pages.

Notice of Allowance for U.S. Appl. No. 14/542,342 dated May 22, 2019, 7 pages.

Final Office Action for U.S. Appl. No. 14/133,431 dated Apr. 22, 2016, 15 pages.

Final Office Action for U.S. Appl. No. 14/133,431 dated Aug. 25, 2017, 19 pages.

Final Office Action for U.S. Appl. No. 14/542,353 dated Sep. 9, 2019, 13 pages.

Non-Final Office Action for U.S. Appl. No. 14/133,431 dated Aug. 26, 2015, 13 pages.

Non-Final Office Action for U.S. Appl. No. 14/133,431 dated Feb. 13, 2017, 16 pages.

Non-Final Office Action for U.S. Appl. No. 14/133,431 dated Feb. 26, 2018, 18 pages.

Non-Final Office Action for U.S. Appl. No. 14/133,431 dated Oct. 5, 2018, 21 pages.

Notice of Allowance for U.S. Appl. No. 14/133,431 dated Jun. 13, 2019, 14 pages.

Notice of Allowance for U.S. Appl. No. 14/133,431 dated Sep. 24, 2019, 14 pages.

* cited by examiner

```
CREATE VIEW web_event (
    referrer VARCHAR) AS
SELECT * FROM event
WHERE type ='w';
```

DriverManager.connect("jbdc:phoenix:localhost;tenantId=me"); } Tenant-specific connection 210

```
CREATE VIEW my_web_event AS
SELECT * FROM web_event;
```
} Tenant-specific view 220

FIG. 2

| Table 500 | | | |
|---|---|---|---|
| | Column Family A 520 | | Column Family B 525 |
| | Qualifier 1 530 | Qualifier 2 535 | Qualifier 3 540 |
| Row Key 1 510 | Value 550 | | |
| Row Key 2 512 | | Value 560 | Value 570 |
| Row Key 3 514 | Value 555 | | |

FIG. 5

| | Table 500 | | | |
|---|---|---|---|---|
| | Column Family A  520 | | Column Family B  525 | |
| | Qualifier 1  530 | Qualifier 2  535 | Qualifier 3  540 | |
| *Row Key 1*  510 | Value  550 | | | |
| *Row Key 2*  512 | | Value  560 | Value  570 | |
| *Row Key 3*  514 | Value  555 | | | |

Multiple Versions

FIG. 6

MULTI-TENANCY FOR STRUCTURED QUERY LANGUAGE (SQL) AND NON STRUCTURED QUERY LANGUAGE (NOSQL) DATABASES

CLAIM OF PRIORITY

This application is a continuation of, and claims priority to, non-provisional utility application Ser. No. 14/542,348 entitled "MULTI-TENANCY FOR STRUCTURED QUERY LANGUAGE (SQL) AND NON STRUCTURED QUERY LANGUAGE (NOSQL) DATABASES," filed Nov. 14, 2014, now U.S. Pat. No. 10,061,823 issuing Aug. 28, 2018; this application is also related to, and claims priority to, provisional utility application No. 61/904,826 entitled "MULTI-TENANCY FOR A NOSQL DATABASE," filed Nov. 15, 2013; provisional utility application No. 61/904,822 entitled "SCALABLE OBJECTS," filed on Nov. 15, 2013; provisional utility application No. 61/905,439 entitled "BIG OBJECTS," filed Nov. 18, 2013; provisional utility application No. 61/905,457 entitled "ORCHESTRATION BETWEEN TWO MULTI-TENANT DATABASES," filed Nov. 18, 2013; and provisional utility application No. 61/905,460 entitled "FIELD HISTORY RETENTION," filed Nov. 18, 2013, the entire contents of which are all incorporated herein by reference.

TECHNICAL FIELD

Embodiments relate to databases and database management. More particularly, embodiments relate to techniques and structures to provide multitenancy functionality for non structured query language (NoSQL) database systems.

BACKGROUND

Any subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

As service providers grow (in terms of numbers of customers and/or amount of customer data), data retention and management becomes more complex. With that growth comes the significant challenge of how to effectively and efficiently represent the increased volume of data. Users typically want consistent interfaces and/or functionality while also needing more suitable storage and semantics.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 is an example code to provide a shared table in a multitenant environment.

FIG. 5 is a conceptual diagram of a table in a non-relational database that can be utilized as described herein.

FIG. 6 is a conceptual diagram of multiple versions of a table in a non-relational database that can be utilized as described herein.

DETAILED DESCRIPTION

Figure 1:
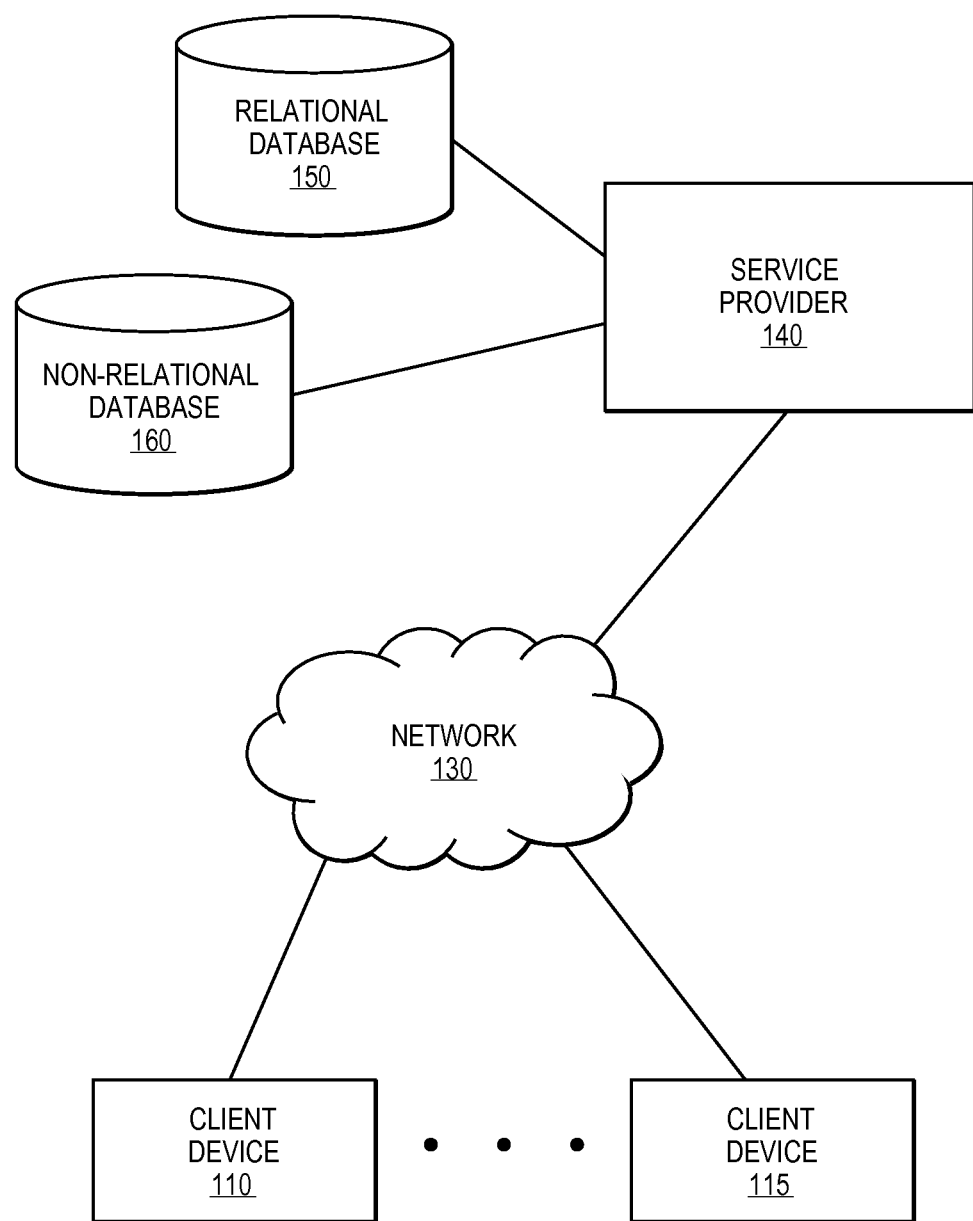
FIG. 1 is a block diagram of one embodiment of an architecture that may provide multi-tenancy utilizing both at least one SQL database and at least one NoSQL database as described herein.

In the following description, numerous specific details are set forth. However, embodiments of the invention may be practiced without these specific details. In other instances, well-known circuits, structures and techniques have not been shown in detail in order not to obscure the understanding of this description.

In a multitenant environment where, for example, a majority of data storage requirements can be solved without using a relational database, it may be desirable to provide some or all of the required storage with a non-relational database. A significant reason for this is that data does not change, therefore the transactional ACID (atomicity, consistency, isolation, durability) properties of are not required. If a new object type is to be considered, it should unhook users/tenants/customers from these constraints when it is appropriate to do so, and when the business use cases and requirements around this data meet certain criteria—namely that data, after it is created rarely ever changes.

Unlike traditional relational databases, a single non-relational database table, such as an HBase™ table, can comfortably grow to any size. There can be good reasons to have a relatively small number of tables on a cluster (e.g., <thousands). For example, there are fewer stores to access, immutable data can be indexed more fully, etc. Apache HBase™ is an open source, non-relational, distributed database and is part of Apache Software Foundation's Apache Hadoop project that runs on top of the Hadoop Distributed File System (HDFS). HBase™ is just one example of a non-relational database. Other examples include Oracle NoSQL Database, CouchDB, Cloudant, etc.

Additionally, non-relational databases can have an arbitrary set of column qualifiers in every row, which means that one physical table need not be limited to a single schema with a fixed set of columns. A one-to-one correspondence of schema to table is somewhat artificially limiting. As a result, apps cannot necessarily share large physical tables across many logical system schemas.

Described herein are techniques and architectures to enforce multitenant structures in an environment in which each tenant can have access to both SQL and NoSQL databases as well as other functionality. By enforcing a multitenancy structure across both database types, the architecture described herein can provide users with a more flexible and robust environment than can be provided with either database type alone and can provide a consistent user interface experience.

Various embodiments of the architectures and techniques described herein can function to provide a structured query language (SQL) interface to a non-relational database via, for example, a client-embedded database application (e.g., JDBC driver, ODBC driver) as well as to a SQL database. In one embodiment, a SQL query can be parsed and complied into a series of non-relational database scans. In one embodiment, the client-embedded database application (or other component) can orchestrate the scans to produce result sets. In on embodiment, table metadata can be utilized to provide use of correct schema in responding to these scans. In one embodiment, scans can be performed in parallel.

Described herein are systems and architectures that provide the ability to run one or more views (or tenant-specific tables) that use a single common physical non-relational (e.g., HBase) table. Database operations are translated to equivalent non-relational database scans. For example, when a tenant issues the query "SELECT * FROM foo_view", the system can translate that to "SELECT c1, c2, c3 from foo_table".

In one embodiment, the structure of the primary key (row key) of all the views may be the same. The syntax structure may include the ability to specify the backing non-relational table by, for example, either adding a WITH clause or a TABLESPACE clause in the CREATE TABLE statement and allowing a tenant to alter an existing table, not create a new one.

In one embodiment, the base table may be created via a connection that does not specify a tenant id. This may define the row key columns and any base key value columns. Tenants may then add/remove their own key value columns, and the system handles combining the "base" columns with the "tenant" columns based on a tenant identifier (tenantId) specified at connection time.

In one embodiment, the system may determine whether to automatically enforce row ownership by virtual table by, for example, transparently including the tenantId in the rowkey, or leave that to the individual tenants. In one embodiment, this can be done by including a hidden column in the row, or a bit in the rowkey, that indicates a virtual table the various rows.

What follows is but one example of a technique for creating and managing this functionality. In one embodiment, tenantId can be added as the leading part of the SYSTEM.TABLE row key and can be defined as a nullable VARCHAR. Other techniques can also be utilized to use the tenantId to enforce row ownership. In one embodiment, a conversion script can be utilized to insert a null byte in the row key of each row to be used in the multitenant environment. For example, each row of the SYSTEM.TABLE can include a null byte. This can be utilized to define the base table.

In one embodiment, the non-relational database can include a table name key value column. In HBase™, for example, a HBASE_TABLE_NAME VARCHAR key value column can be added to SYSTEM.TABLE. This can be null for the base table and populated for derived tables. Optionally, a TABLE_ID key value column can be added to SYSTEM.TABLE that can be null for the base table and populated for the derived tables with the key prefix. The system can include the logical schema name plus table name in the row key of the physical table.

In one embodiment, the above mentioned grammar changes can be utilized to support a definition of the physical non-relational table in a CRATE TABLE statement. In one embodiment, it can be a new property. This data can e passed to SYSTEM.TABLE with an UPSERT command. In one embodiment, this data can be cached.

In one embodiment, a createTable method can operate to check for these properties and enforce that no primary key is defined for these new types of derived tables. In on embodiment, the system can allow additional nullable row key columns to be added. In one embodiment, the system can also check that the base table row key conforms to the following: 1) a tenant ID column and a logical table ID column are declared; and 2) the row key leads with the tenant ID column followed by the logical table ID column. Other base table row key conventions can also be supported.

In one embodiment, the tenant ID and the logical table ID are utilized to determine which sets of data queries should run against. This can be part of the enforcement of tenant-specific operations in a multitenant environment. Schemas designed for multitenant environments are likely to have common schemes for how tenant-specific data is to be stored. In one embodiment, each row key can start with the tenant ID. In alternate embodiments, the tenant ID can be incorporate into a table's schema or table name.

In one embodiment, the system can provide automatic query rewriting within a multitenant environment. In one embodiment, a tenant ID is associated with a connection to the multitenant environment. In one embodiment, the connection is treated as tenant-specific and data manipulation language (DML) operations are automatically rewritten to enforce tenant separation.

The following is an example of a multitenant user table data definition language (DDL) statements that prefix for each row key with a tenant ID.

CREATE TABLE user (tenant_id INTEGER, user_id INTEGER, name VARCHAR
    CONSTRAINT pk PRIMARY KEY (tenant_id, user_id))

The client opens a system connection and sets tenantID to be 123 and issues "select name from user where user_id='456'"

When the system receives the query, it may check to see if the tenant is specified on the connection. If specified, the query may be rewritten to be "select name from user where tenant_id=123 and user_id='456'."

FIG. 1 is a block diagram of one embodiment of an architecture that may provide multitenancy utilizing both at least one SQL database and at least one NoSQL database as described herein. In one embodiment, client devices are used by one or more users to access services from a service provider. The service provided can be, for example, an on-demand services environment, a multitenant database environment, or any other type of service provider.

Client devices 110 and 115 operate to allow a user to access remote services provided by service provider 140 via network 130. Client devices 110 can be, for example, desktop computers, laptop computers, tablets, smart phones, thin clients, etc. Network 130 can be any network, for example, the Internet, a corporate local area network or wide area network, a cellular network, and/or any combination thereof.

Service provider 140 can be any number of servers and/or other devices that operate to provide services to one or more client devices. In one embodiment, service provider 140 operates with one or more relational databases (e.g., 150) and one or more non-relational databases (e.g., 160). Service provider 140 operates using relational database 150 and non-relational database 160 as described above.

In one embodiment, service provider 140 is an on-demand services environment with multiple client organizations that provides different and/or different levels of services to the client organizations. For example, service provider 140 can be a multitenant database environment that provides custom interfaces and data isolation to the different client organizations. In the example, multitenant database environment, the utilization of relational database 150 and non-relational database 160 can be on an organization-by-organization basis with different parameters and/or conditions for different organizations.

In one embodiment, service provider 140 operates using relational database 150 to provide custom objects, which are custom database tables that allow a customer/tenant/organization to store information unique to the customer/tenant/organization. For example, an organization may create a custom object called "Quotes" to store data for the organization's sales quotes. The custom object can be used to, for example, create custom fields, associate the custom object with other records and display the custom object data in custom related lists, track tasks and events for custom object records, build page layouts, customize search results and the custom object fields that display them, create reports and dashboards to analyze custom object data, import custom object records.

FIG. 2 is an example code to provide a shared table in a multitenant environment. The example of FIG. 2 creates tenant-specific connection 210 and provides tenant-specific view 220.

Figure 3:
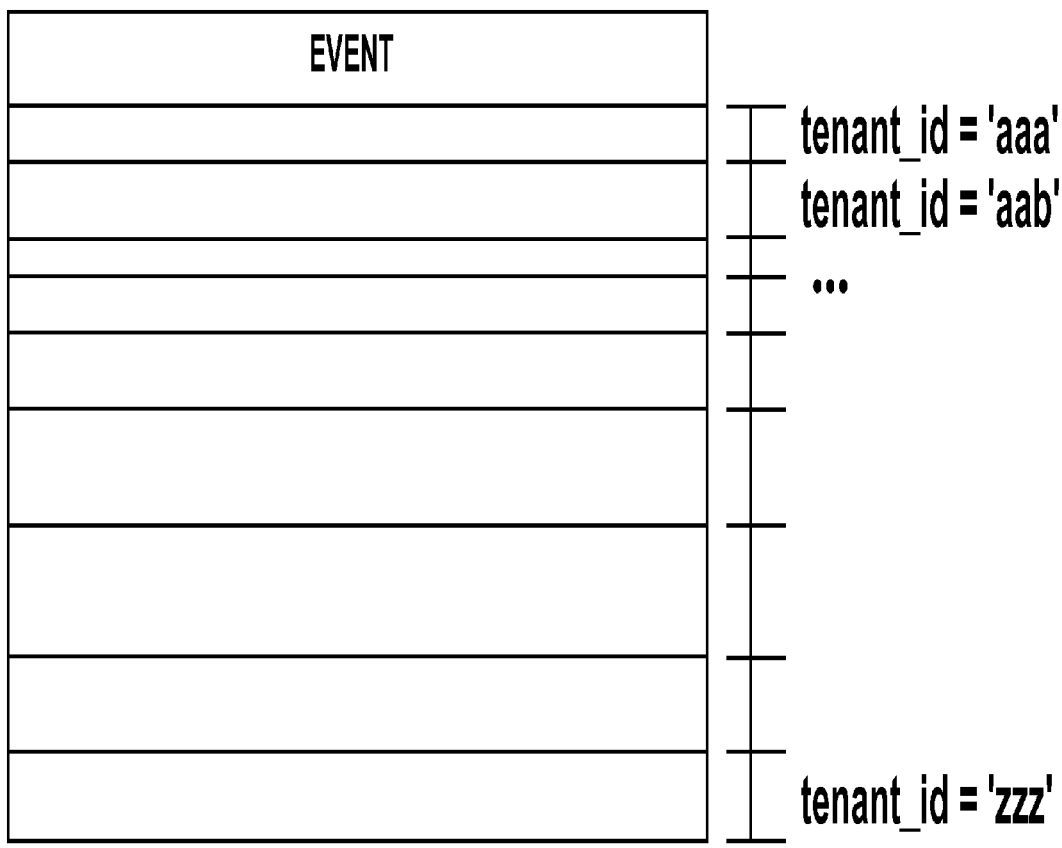
FIG. 3 is a conceptual example of a shared table within a non-relational database with rows grouped by tenant.

FIG. 3 is a conceptual example of a shared table within a non-relational database with rows grouped by tenant. In the example of FIG. 3, illustrates a single non-relational database table having rows designated by tenant ID (e.g., tenant_id='aaa', tenant_id='aab') where rows are designated as discussed above.

Figure 4:
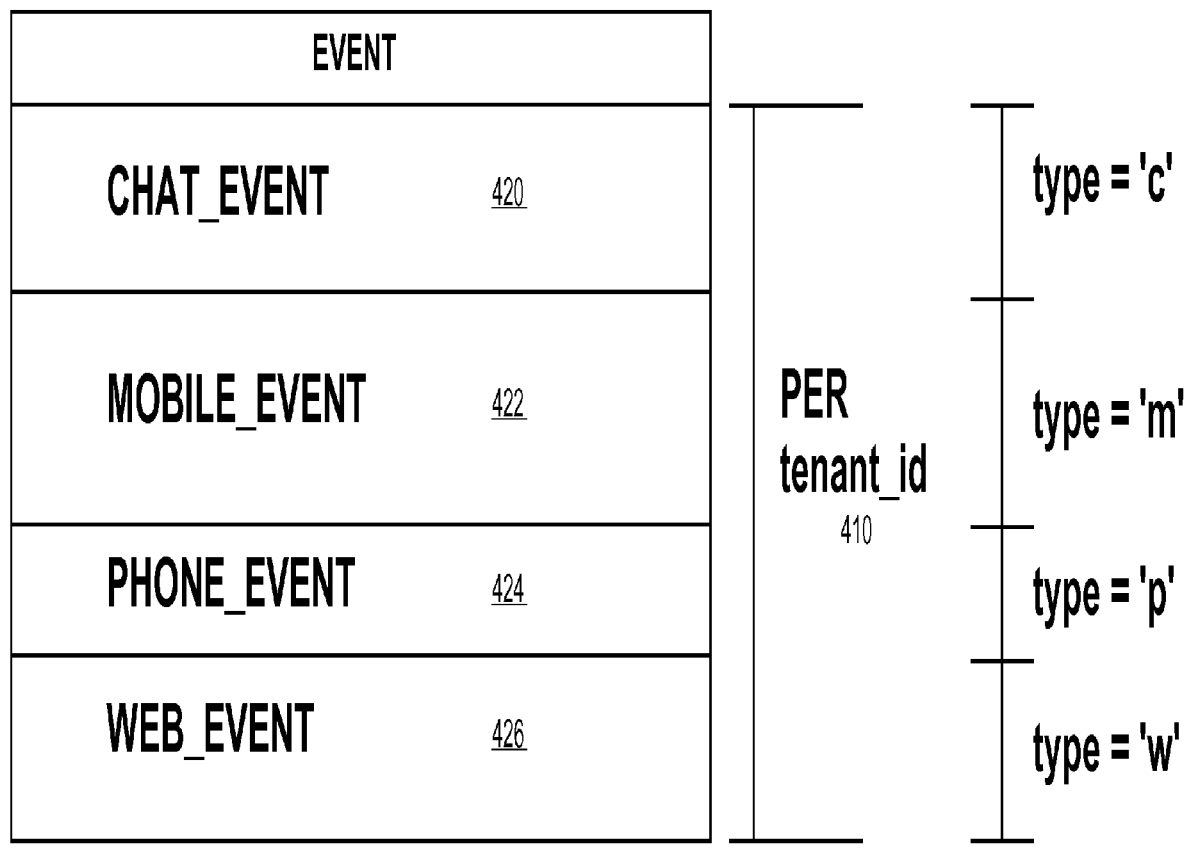
FIG. 4 is a conceptual example of rows corresponding to a tenant within a shared table of a non-relational database.

FIG. 4 is a conceptual example of rows corresponding to a tenant within a shared table of a non-relational database. Each tenant can have one or more rows within the tenant space (e.g., PER tenant_id) 410, subdivided into groups of rows to be utilized by the tenant for tenant specific purposes that can be designated, for example, by type. The example of FIG. 4 includes CHAT_EVENT 420, MOBILE_EVENT 422, PHONE-EVENT 424 and WEB_EVENT 426; however, any number and type of groups can be supported.

In one embodiment, in order to provide the functionality described herein, the multitenant environment will enforce a tenant-specific connection such that a tenant can only see and operate on their data. In one embodiment, metadata application programming interfaces (APIs) can operate to enforce this data isolation. In one embodiment, the multitenant environment can automatically manage scan ranges for the non-relational database to limit access to a tenant's own data.

In one embodiment, the primary key constraint of the base table cannot be changed and indexes in separate shared tables can be added to a VIEW. In one embodiment, one or more DDL operations can be restricted, for example, no ALTER of the base table and/or no DROP of columns reference in a WHERE clause.

FIG. 5 is a conceptual diagram of a table in a non-relational database that can be utilized as described herein. Table 500 is a non-relational database table that can be shared by multiple tenants of a multitenant environment. Rows are identified by row keys (e.g., 510, 512, 514) as described above. In one embodiment, columns are used by tenants to manage data associated with the various tenants. In one embodiment, column families (e.g., 520, 525) that include one or more columns can be utilized to organize data values. In one embodiment, each column has an associated qualifier (e.g., 530, 535, 540). Combinations of row keys, column family identifiers and/or qualifiers can be utilized to access data values (e.g., 550, 555, 560, 570) stored in table 500. Table 500 can be any size with any number of rows and columns.

FIG. 6 is a conceptual diagram of multiple versions of a table in a non-relational database that can be utilized as described herein. In one embodiment, the multitenant environment can maintain multiple versions (e.g., 600, 610, 620) of the shared table.

Figure 7:
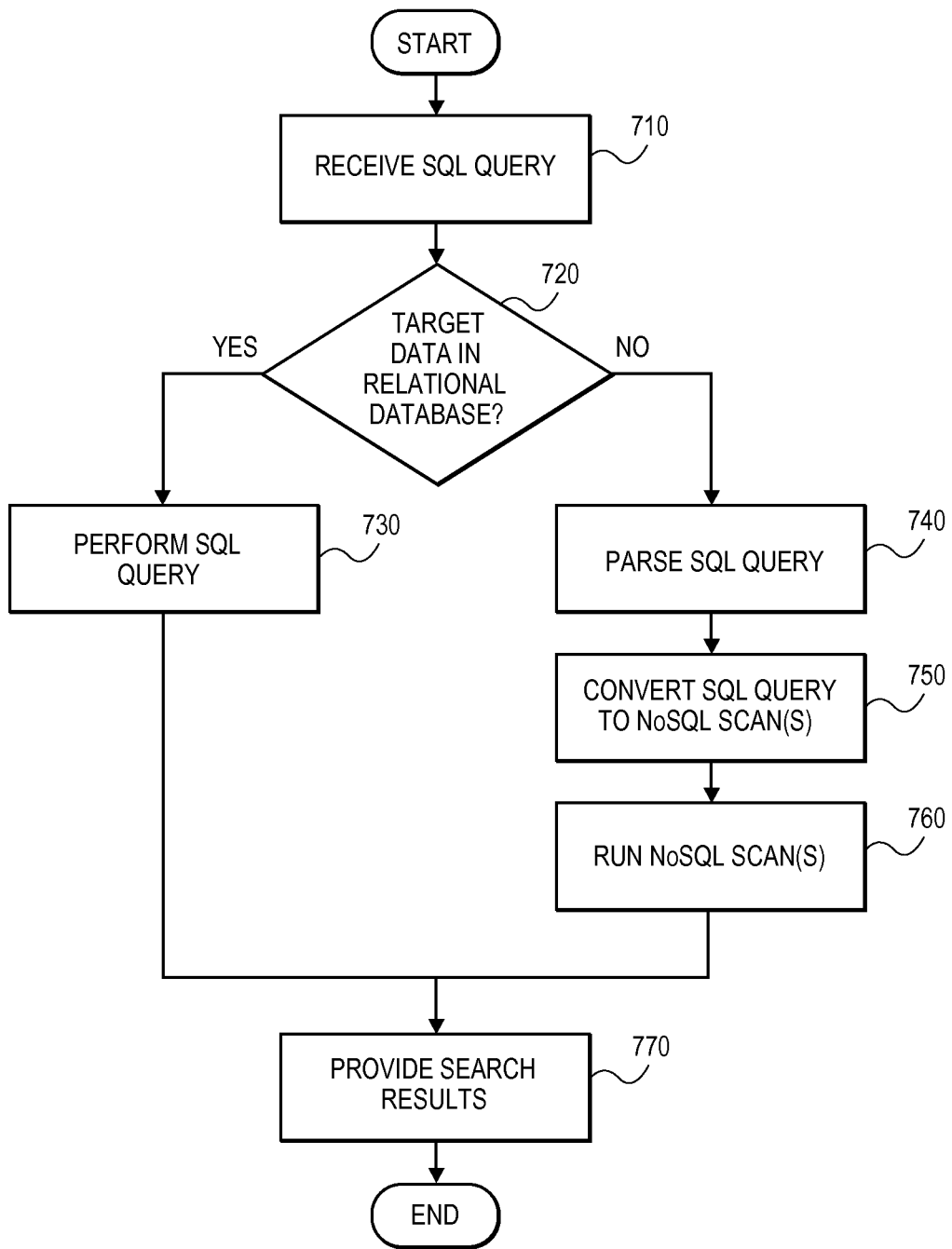
FIG. 7 is a flow diagram for managing a SQL query in a multitenant environment having both a relational database and a non-relational database.

FIG. 7 is a flow diagram for managing a SQL query in a multitenant environment having both a relational database and a non-relational database. In one embodiment, both the relational database and the non-relational database are accessed by a single user interface that does not require the user to differentiate between database types and/or can search either one or both database types. A SQL query is received via a user interface, or in another way, 710.

In response to receiving the query, the system can determine whether some or all of the data that is the target of the query resides in the relational database, 720. For the data that resides in the relational database, the SQL query is performed, 730. In one embodiment, the original query can be directed to data in both database types, so the SQL query (730) can be a partial fulfillment of the original SQL query (710).

For the data that resides in the non-relational database, the SQL query is parsed, 740. The various components of the SQL query are then converted to corresponding scans to be run against data in the non-relational database, 750. The scans of the non-relational database are run, 760. In one embodiment, multiple scans can be run in parallel.

Search results are provided, 770. In one embodiment, search results are provided via a graphical user interface or other output mechanism to provide the results to one or more users. The results can also be transmitted and/or stored. In one embodiment, the results are unified and the user is not informed of the potential division of searches/scans between the relational database and the non-relational database.

Figure 8:
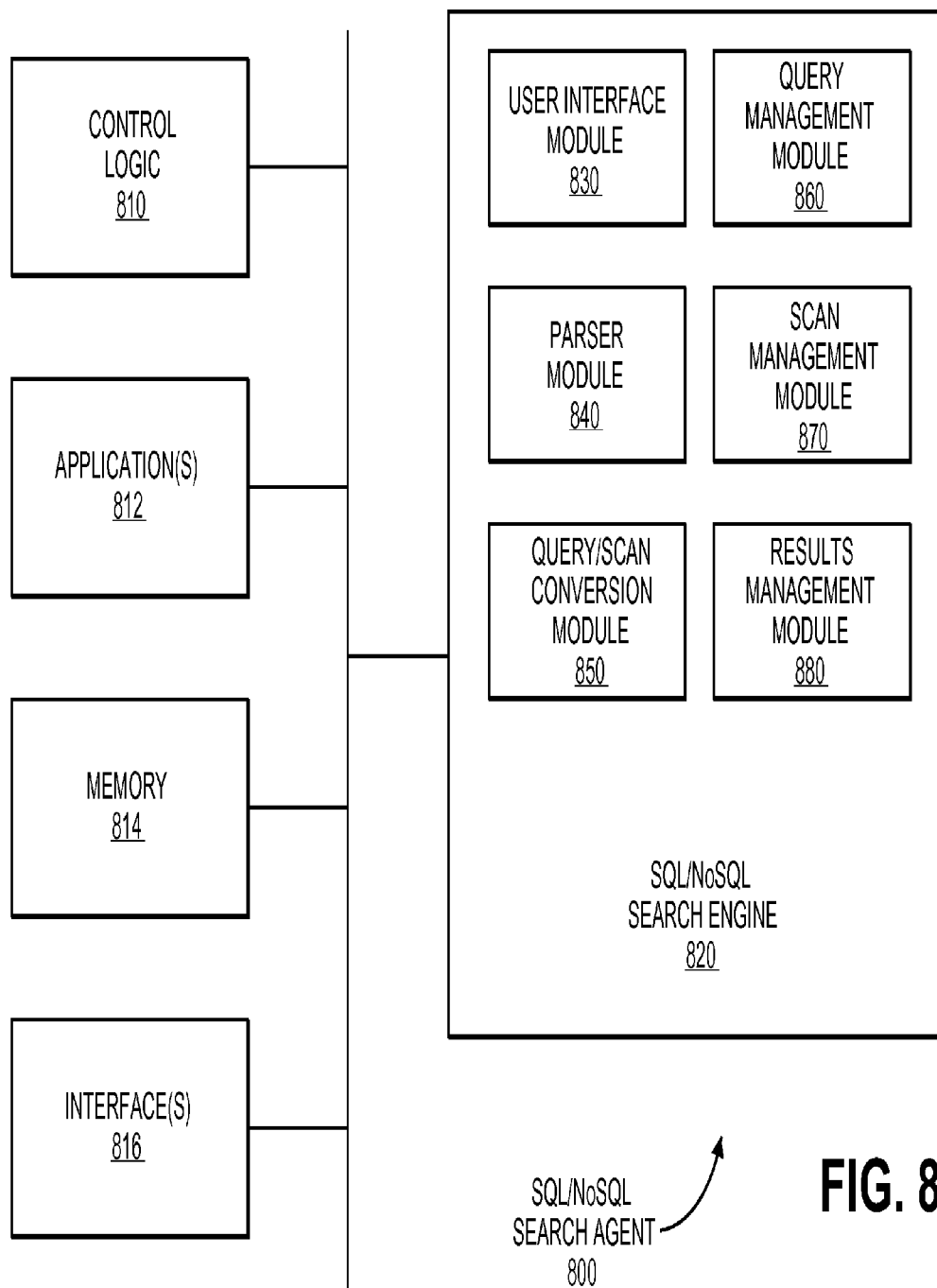
FIG. 8 is a block diagram of one embodiment of a SQL/NoSQL search agent that can provide the functionality described herein.

FIG. 8 is a block diagram of one embodiment of a SQL/NoSQL search agent that can provide the functionality described herein. SQL/NoSQL search agent 800 includes control logic 810, which implements logical functional control to direct operation of SQL/NoSQL search agent 800, and/or hardware associated with directing operation of SQL/NoSQL search agent 800. Logic may be hardware logic circuits and/or software routines. In one embodiment, SQL/NoSQL search agent 800 includes one or more applications 812, which represent code sequence and/or programs that provide instructions to control logic 810.

SQL/NoSQL search agent 800 includes memory 814, which represents a memory device and/or access to a memory resource for storing data and/or instructions. Memory 814 may include memory local to SQL/NoSQL search agent 800, as well as, or alternatively, including memory of the host system on which SQL/NoSQL search agent 800 resides. SQL/NoSQL search agent 800 also includes one or more interfaces 816, which represent access interfaces to/from (an input/output interface) SQL/NoSQL search agent 800 with regard to entities (electronic or human) external to SQL/NoSQL search agent 800.

SQL/NoSQL search agent 800 also includes SQL/NoSQL engine 820, which represents one or more functions or module that enable SQL/NoSQL search agent 800 to provide the indexing services as described above. The example of FIG. 8 provides several modules that may be included in SQL/NoSQL engine 820; however, different and/or additional modules may also be included.

Example modules that may be involved in providing the multitenant environment functionality utilizing both at least one relational database and at least one non-relational database include user interface module 830, parser module 840, query/scan conversion module 850, query management module 860, scan management module 870 and results management module 880. Each of these modules may further include other sub-modules to provide other functions. As used herein, a module refers to routine, a subsystem, logic circuit, microcode, etc., whether implemented in hardware, software, firmware or some combination thereof.

User interface module 830 operates to provide at least one graphical user interface on an electronic device to allow a user to access a multitenant environment that may utilize one or more databases. The user interface can include any number of elements and components including a search functionality that either receives a query from the user or generates a query from the user based on actions and/or input from the user. In one embodiment, the query is a SQL query, but other types of queries can also be supported.

In one embodiment, the query is provided to parser module 840. Parser module 840 operates to parse the query and to determine whether some or all of the query should be converted to one or more non-relational database scans. In one embodiment, parser module 840 can determine whether data to be searched is stored in the relational database or the non-relational database. In one embodiment, parser module 840 marks or otherwise which portions of the original query are to be directed to the relational database and which portions of the original query are to be directed to the non-relational database.

In one embodiment, parser module 840 provides some or all of the original query to query/scan conversion module 850. Query/scan conversion module 850 operates to convert the portions of the original query that are to directed to data in the non-relational database to one or more non-relational database scans.

Query management module 860 operates to manage execution of queries on the relational database. In one embodiment, query management module 860 manages SQL queries; however, in in alternate embodiments other query types can be supported. Scan management module 870 operates to manage execution of scans on the non-relational database. In one embodiment, scan management module 870 may cause multiple scans to be performed in parallel.

Results management module 880 operates to compile results of the query on the relational database and the scan(s) on the non-relational database into a result. The result may be integrated and provided to user interface module 830 to provide the result to the user.

Figure 9:
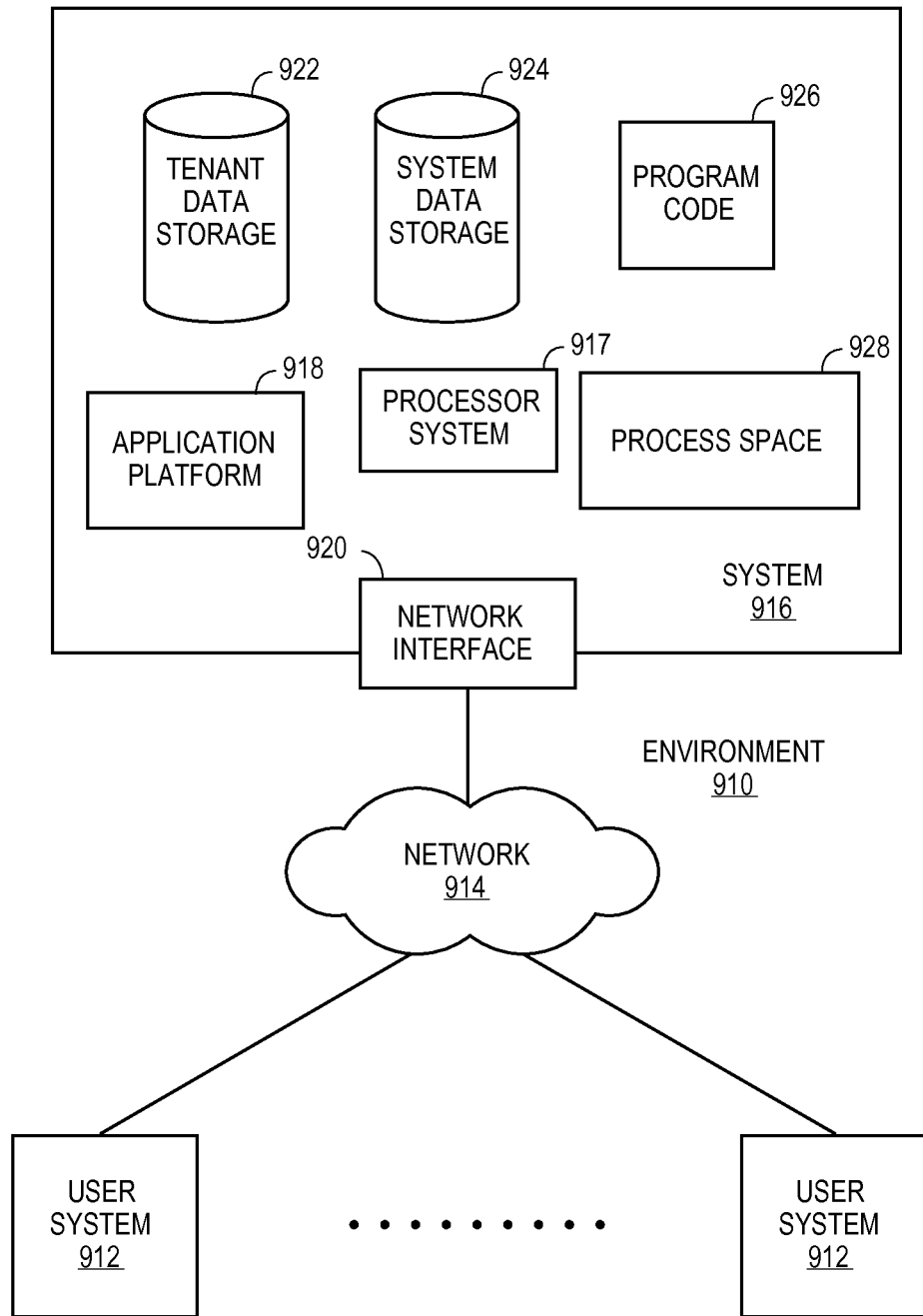
FIG. 9 is a block diagram of one environment wherein an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
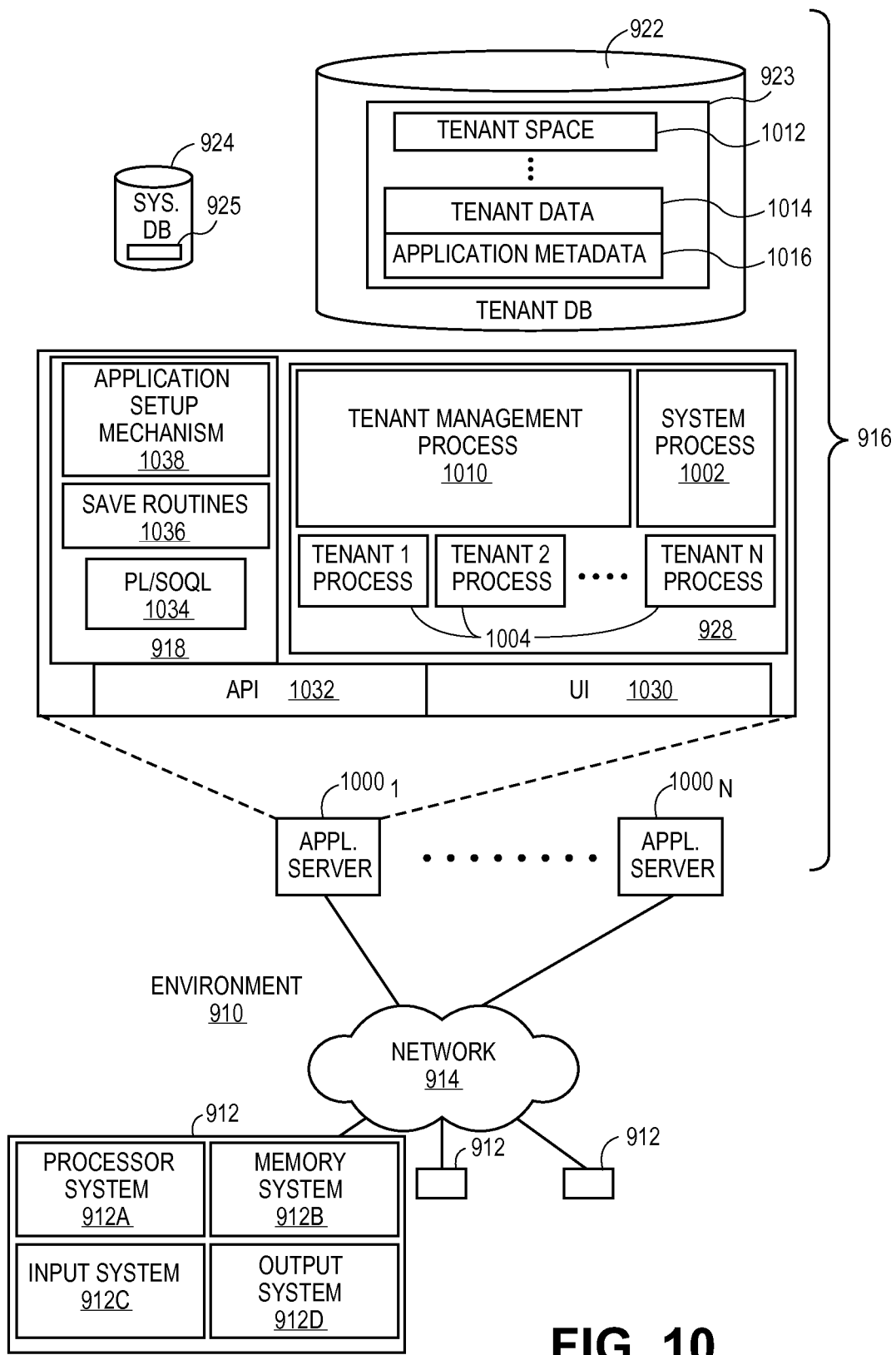
FIG. 10 is a block diagram of one embodiment of elements of environment of FIG. 9 and various possible interconnections between these elements.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$400_N$, system process space 1002, tenant process spaces 1004, tenant management process space 1010, tenant storage space 1012, tenant data 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage spaces 1012, which can be either a physical arrangement and/or a logical arrangement of data. Within each tenant storage space 1012, tenant data 1014 and application metadata 1016 might be similarly allocated for each user. For example, a copy of a user's most recently used (MRU) items might be stored to tenant data 1014. Similarly, a copy of MRU items for an entire organization that is a tenant might be stored to tenant storage space 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   a group of one or more server computing devices configured to provide a computing environment that provides on-demand service to client entities;
   at least one relational database system coupled with the one or more server computing devices, the at least one relational database system to provide data management services to tenants of the computing environment;
   at least one non-relational database system coupled with the one or more server computing devices, the at least one non-relational database system to provide data management services to client entities of the computing environment, the non-relational database system to manage scan ranges for the non-relational database to limit access for each client entity to data in the non-relational database corresponding to that client entity, wherein a primary key constraint of a base table cannot be changed and indexes in separate shared tables can be added;
   a database search agent coupled with the at least one relational database system and with the at least one non-relational database system, the database search agent to receive a database query in a format corresponding to the relational database system, to parse the query to find one or more components of the query directed to data stored in the non-relational database system, to convert one or more components of the query directed to data stored in the non-relational database system to one or more scans of the non-relational database system wherein table metadata is utilized to provide use of correct schema in responding to the one or more scans, to collect results from the query of the relational database system and results from the one or more scans of the non-relational database system, to combine the results from the query and the results of the one or more scans to a combined result, and to provide the combined result to a client entity.

2. The system of claim 1 wherein the multitenant environment comprises a multitenant on-demand services environment.

3. The system of claim 2 wherein the multitenant on-demand service environment comprises at least a multi-tenant database environment.

4. The system of claim 1 wherein data stored in the non-relational database is immutable.

5. The system of claim 1 wherein the at least one non-relational database system to provide the ability to run one or more client entity-specific tables that use a single common physical non-relational database table.

6. A method comprising:
receiving a database query with at least one server computing device providing a computing environment having a relational database system and a non-relational database system, the database query in a format corresponding to the relational database system;
parsing the query with the at least one server computing device to find one or more components of the query directed to data stored in the non-relational database system;
converting with the at least one server computing device, one or more components of the query directed to data stored in the non-relational database system to one or more scans of the non-relational database system wherein table metadata is utilized to provide use of correct schema in responding to the one or more scans;
managing scan ranges for the non-relational database to limit access for each entity to data in the non-relational database corresponding to that entity, wherein a primary key constraint of a base table cannot be changed and indexes in separate shared tables can be added;
collecting results from the query of the relational database system and results from the one or more scans of the non-relational database system;
combining the results from the query and the results of the one or more scans to a combined result; and
providing the combined result to a client entity.

7. The method of claim 6 wherein the multitenant environment comprises a multitenant on-demand services environment.

8. The method of claim 7 wherein the multitenant on-demand service environment comprises at least a multitenant database environment.

9. The method of claim 6 wherein data stored in the non-relational database is immutable.

10. The method of claim 6 wherein the at least one non-relational database system to provide the ability to run one or more client entity-specific tables that use a single common physical non-relational database table.

11. A non-transitory computer-readable medium having stored thereon instructions that, when executed by one or more processors, cause the one or more processors to:
receive a database query with at least one server computing device providing a computing environment having a relational database system and a non-relational database system, the database query in a format corresponding to the relational database system;
parse the query with the at least one server computing device to find one or more components of the query directed to data stored in the non-relational database system;
convert with the at least one server computing device, one or more components of the query directed to data stored in the non-relational database system to one or more scans of the non-relational database system wherein table metadata is utilized to provide use of correct schema in responding to the one or more scans;
manage scan ranges for the non-relational database to limit access for each entity to data in the non-relational database corresponding to that entity, wherein a primary key constraint of a base table cannot be changed and indexes in separate shared tables can be added;
collect results from the query of the relational database system and results from the one or more scans of the non-relational database system;
combine the results from the query and the results of the one or more scans to a combined result; and
provide the combined result to a client entity.

12. The non-transitory computer-readable medium of claim 11 wherein the multitenant environment comprises a multitenant on-demand services environment.

13. The non-transitory computer-readable medium of claim 12 wherein the multitenant on-demand service environment comprises at least a multitenant database environment.

14. The non-transitory computer-readable medium of claim 11 wherein data stored in the non-relational database is immutable.

15. The non-transitory computer-readable medium of claim 11 wherein the at least one non-relational database system to provide the ability to run one or more client entity-specific tables that use a single common physical non-relational database table.

* * * * *